(12) United States Patent
Mellet et al.

(10) Patent No.: US 8,721,488 B2
(45) Date of Patent: *May 13, 2014

(54) MULTI-SPEED TRANSMISSION

(75) Inventors: Edward W. Mellet, Rochester Hills, MI (US); James B. Borgerson, Clarkston, MI (US); James M. Hart, Belleville, MI (US)

(73) Assignee: GM Global Technology Operations, Detroit, MI (US)

( * ) Notice: Subject to any disclaimer, the term of this patent is extended or adjusted under 35 U.S.C. 154(b) by 146 days.

This patent is subject to a terminal disclaimer.

(21) Appl. No.: 13/313,842

(22) Filed: Dec. 7, 2011

(65) Prior Publication Data
US 2012/0214634 A1    Aug. 23, 2012

Related U.S. Application Data

(60) Provisional application No. 61/444,084, filed on Feb. 17, 2011.

(51) Int. Cl.
*F16H 3/72* (2006.01)
*F16H 37/06* (2006.01)
*F16H 3/62* (2006.01)

(52) U.S. Cl.
USPC .............................................. 475/276; 475/5

(58) Field of Classification Search
USPC ........................................................ 475/5, 276
See application file for complete search history.

(56) References Cited

U.S. PATENT DOCUMENTS

| 6,960,149 | B2 | 11/2005 | Ziemer | |
| 6,984,187 | B2 * | 1/2006 | Biermann | 475/275 |
| 8,251,857 | B1 * | 8/2012 | Mellet et al. | 475/280 |

FOREIGN PATENT DOCUMENTS

JP    2006266482 A    10/2006

* cited by examiner

*Primary Examiner* — David D Le
*Assistant Examiner* — Colby M Hansen

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches and brakes.

24 Claims, 5 Drawing Sheets

| TQS & SPDS | | | 30 CB57R CLUTCH GND S1 | 32 CB139 CLUTCH GND R1 | 34 CB48 CLUTCH GND PC1 | 36 CB12R CLUTCH GND PC3 | 26 C6789 CLUTCH P2_6 PC3 | 28 C23456 CLUTCH P2_6 S4 |
|---|---|---|---|---|---|---|---|---|
| GEAR STATE | GEAR RATIO | RATIO STEP | | | | | | |
| REV | -5.396 | | X | | | X | | |
| N | | -1.11 | | | | O | | |
| 1ST | 4.849 | | | X | | X | | |
| 2ND | 2.926 | 1.66 | | | | X | | X |
| 3RD | 2.112 | 1.39 | | X | | | | X |
| 4TH | 1.483 | 1.42 | | | X | | | X |
| 5TH | 1.170 | 1.27 | X | | | | | X |
| 6TH | 0.984 | 1.19 | | | | | X | X |
| 7TH | 0.845 | 1.16 | X | | | | X | |
| 8TH | 0.730 | 1.16 | | | X | | X | |
| 9TH | 0.635 | 1.15 | | X | | | X | |

MULTI-SPEED TRANSMISSION

CROSS-REFERENCE TO RELATED APPLICATIONS

This application claims the benefit of U.S. Provisional Application No. 61/444,084 filed on Feb. 17, 2011. The disclosure of the above application is incorporated herein by reference.

FIELD

The invention relates generally to a multiple speed transmission having a plurality of planetary gear sets and a plurality of torque transmitting devices and more particularly to a transmission having nine or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios. Moreover, the development of hybrid powertrains which utilize additional components, such as electric motors, has increased the importance of efficient and compact packaging of the transmission.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In an embodiment of the present invention, a first and a second of the four planetary gear sets are rotatable about a first axis and a third and a fourth of the four planetary gear sets are rotatable about a second axis. The first axis and the second axis are radially offset from each other. The first and third planetary gear sets are substantially disposed within a first radial plane. The second and fourth planetary gear sets are substantially disposed within a second radial plane. A first gear pair transmits torque between the first and second planetary gear sets and the third and fourth planetary gear sets. A second gear pair transmits torque between the first planetary gear set, second planetary gear set, and the input member and the third and fourth planetary gear sets.

In another embodiment of the present invention, a transmission includes an input member, an output member, first, second, third, and fourth planetary gear sets, a first co-planar gear set, a second co-planar gear set, and six torque transmitting devices. The first and a second planetary gear set each have a first, a second, and a third member, where each of the first, second, and third members is included in one of a first rotary member, a second rotary member, a third rotary member, and a fourth rotary member. Two of the members of the first planetary gear set are continuously separately connected with two of the members of the second planetary gear set to form two of the first, second, third, and fourth rotary members. The third and a fourth planetary gear set each have a first, a second, and a third member, where each of the first, second, and third members is included in one of a fifth rotary member, a sixth rotary member, a seventh rotary member, and an eighth rotary member. Two of the members of the third planetary gear set are continuously separately connected with two of the members of the fourth planetary gear set to form two of the fifth, sixth, seventh, and eighth rotary members. The first co-planar gear set has a first member meshed with a second member where the first member is continuously connected with the third rotary member and the second member of the first co-planar gear set is continuously connected with the eighth rotary member. The second co-planar gear set has a first member meshed with a second member where the first member is continuously connected with the first rotary member and the second member of the second co-planar gear set is separately selectively connectable with the fifth and seventh rotary members. The six torque transmitting devices are each selectively engageable to connect at least one of the first, second, third, fourth, fifth, sixth, seventh, and eighth rotary members with at least one other of a stationary member, the first and second members of the first and second co-planar gear sets, and the first, second, third, fourth, fifth, sixth, seventh, and eight rotary members. The torque transmitting devices are selectively engageable in combinations of at least two to establish at least nine forward speed ratios and at least one reverse speed ratio between the input member and the output member.

In another aspect of the present invention, a first of the six torque transmitting devices is selectively engageable to connect the second member of the second co-planar gear set with the seventh rotary member.

In another aspect of the present invention, a second of the six torque transmitting devices is selectively engageable to connect the second member of the second co-planar gear set with the fifth rotary member.

In another aspect of the present invention, a third of the six torque transmitting devices is selectively engageable to connect the fourth rotary member with the stationary member.

In another aspect of the present invention, a fourth of the six torque transmitting devices is selectively engageable to connect the second rotary member with the stationary member.

In another aspect of the present invention, a fifth of the six torque transmitting devices is selectively engageable to connect the eighth rotary member with the stationary member.

In another aspect of the present invention, a sixth of the six torque transmitting devices is selectively engageable to connect the seventh rotary member with the stationary member.

In another aspect of the present invention, the first member of the second planetary gear set forms the first rotary member, the second members of the first and second planetary gear sets are continuously connected to form the second rotary member, the third members of the first and second planetary gear sets are continuously connected to form the third rotary member, the first member of the first planetary gear set forms the fourth rotary member, the first member of the fourth planetary gear set forms the fifth rotary member, the second members of the third and fourth planetary gear sets are continuously connected to form the sixth rotary member, the third members of the third and fourth planetary gear sets are continuously connected to form the seventh rotary member, and the first member of the third planetary gear set forms the eighth rotary member.

In another aspect of the present invention, the first members of the first, second, third, and fourth planetary gear sets are sun gears, the third members of the first, second, and third planetary gear sets and the second member of the fourth planetary gear set are carrier members, and the second members of the first, second, and third planetary gear sets and the third member of the fourth planetary gear set are ring gears.

In another aspect of the present invention, the input member is continuously connected with first rotary member and the output member is continuously connected with the sixth rotary member.

In another aspect of the present invention, four of the six torque transmitting devices are brakes and two of the six torque transmitting devices are clutches.

In another aspect of the present invention, the transmission further includes an electric motor including a rotor that is continuously connected with the first member of the second co-planar gear set.

In another aspect of the present invention, the transmission further includes an electric motor including a rotor that is continuously connected with the second member of the second co-planar gear set.

In another aspect of the present invention, the transmission further includes a seventh torque transmitting device, an eighth torque transmitting device, and an electric motor including a rotor. The seventh torque transmitting device is selectively engageable to connect the fifth rotary member with the rotor of the electric motor and the eighth torque transmitting device is selectively engageable to connect the second member of the second co-planar gear set with the rotor of the electric motor.

In another aspect of the present invention, the transmission further includes an electric motor including a rotor that is continuously connected with the fifth rotary member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
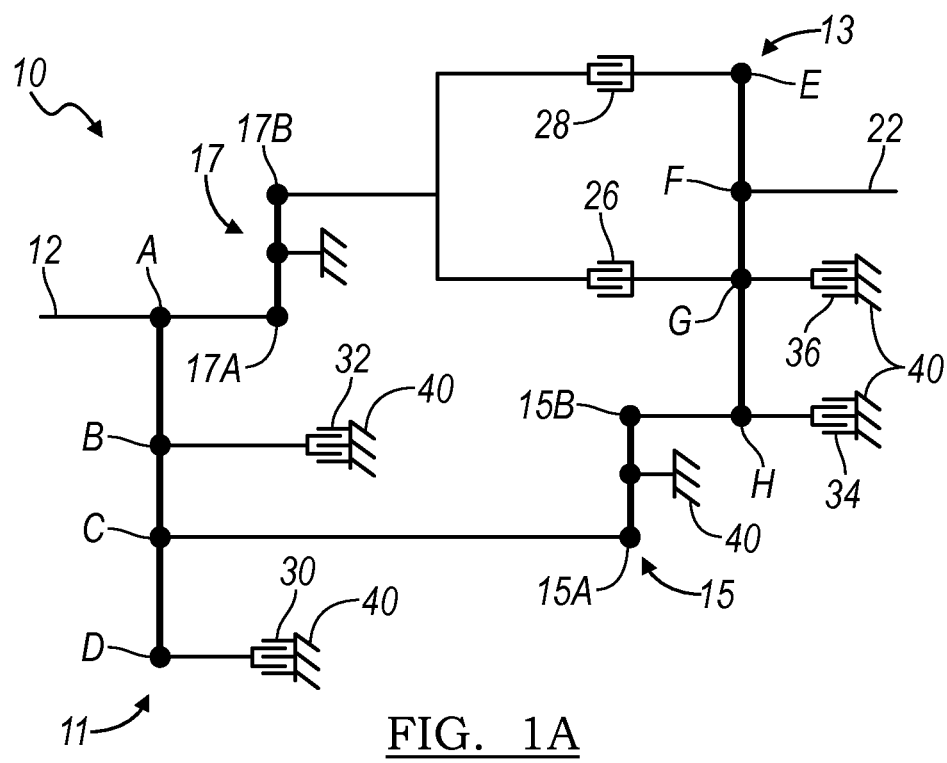
FIG. 1A is a lever diagram of an embodiment of a nine speed transmission according to the present invention.

Referring now to FIG. 1A, an embodiment of a nine speed transmission 10 is illustrated in a lever diagram format. A lever diagram is a schematic representation of the components of a mechanical device such as an automatic transmission. Each individual lever with three nodes represents a planetary gear set wherein the three basic mechanical components of the planetary gear set are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Furthermore, multiple gear sets sharing common connections may be combined into a lever having more nodes. For example, two three-node gear sets that share two common connections may be combined into a single four node lever. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12 and a first lever 11 that represents a combination of a first planetary gear set and a second planetary gear set. Thus, at least two fixed connections are present between the components of the first and second planetary gear set. The first lever 11 includes a first node A, a second node B, a third node C, and a fourth node D. A second lever 13 represents a combination of a third planetary gear set and a fourth planetary gear set. Thus, at least two fixed connections are present between the components of the third and fourth planetary gear set. The second lever 13 includes a first node E, a second node F, a third node G, and a fourth node H. The first node A of the first lever 11 is connected for common rotation with the input shaft or member 12. The second node F of the second lever 13 is connected for common rotation with an output shaft or member 22.

A third lever 15 represents a first external gear pair having a first node 15A and a second node 15B. The first node 15A of the third lever 15 is coupled with the third node C of the first lever 11 and the second node 15B of the third lever 15 is coupled with the fourth node H of the second lever 13. A fourth lever 17 represents a second external gear pair having a first node 17A and a second node 17B. The first node 17A of the fourth lever 17 is coupled with the first node A of the first lever 15.

A first clutch 26 selectively connects the second node 17B of the fourth lever 17 with the third node G of the second lever 13. A second clutch 28 selectively connects the second node 17B of the fourth lever 17 with the first node E of the second lever 13. A first brake 30 selectively connects the fourth node D of the first lever 11 to a stationary member or a transmission housing 40. A second brake 32 selectively connects the second node B of the first lever 11 to a stationary member or transmission housing 40. A third brake 34 selectively connects the second node 15B of the third lever 15 and the fourth node H of the second lever 13 to the stationary member or transmission housing 40. A fourth brake 36 selectively connects the third node G of the second lever 13 to the stationary member or transmission housing 40.

Figure 1B:
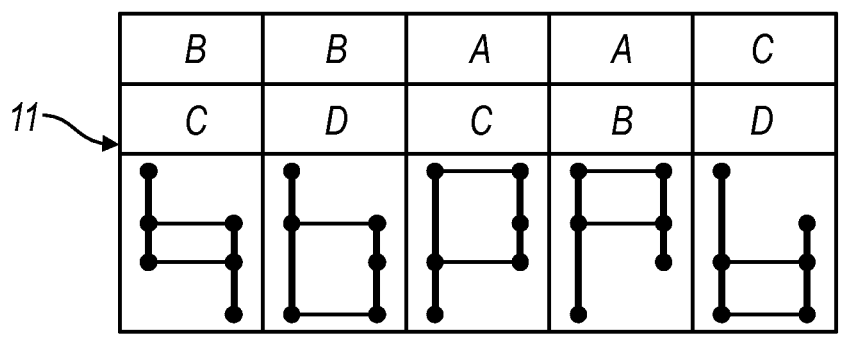
FIG. 1B is a table of planetary gear set combinations in accordance with the embodiment of FIG. 1A.
Figure 1C:
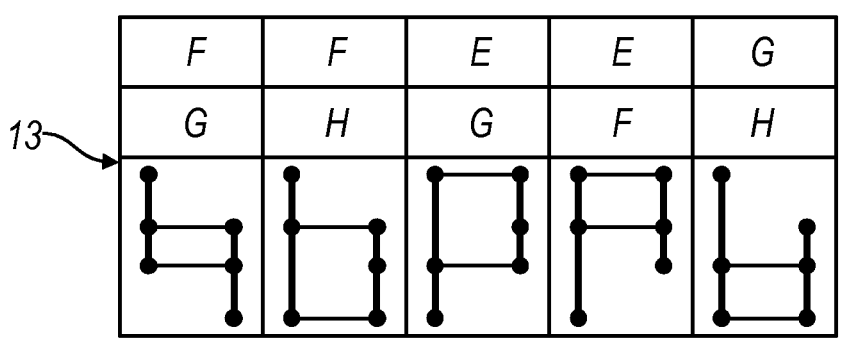
FIG. 1C is a table of planetary gear set combinations in accordance with the embodiment of FIG. 1A.

Referring now to FIG. 1B, a table shows examples of three node levers having two fixed connections between the first and second planetary gear sets. These three node levers are combined to form a four node lever. The three node levers shown in the first column of FIG. 1B are combined to form the four node lever 11 of FIG. 1A. Referring now to FIG. 1C, a table shows examples of three node levers having two fixed connections between the third and fourth planetary gear sets. These three node levers are combined to form a four node lever. The three node levers shown in the first column of FIG. 1C are combined to form the four node lever 13 of FIG. 1A.

Figure 2:
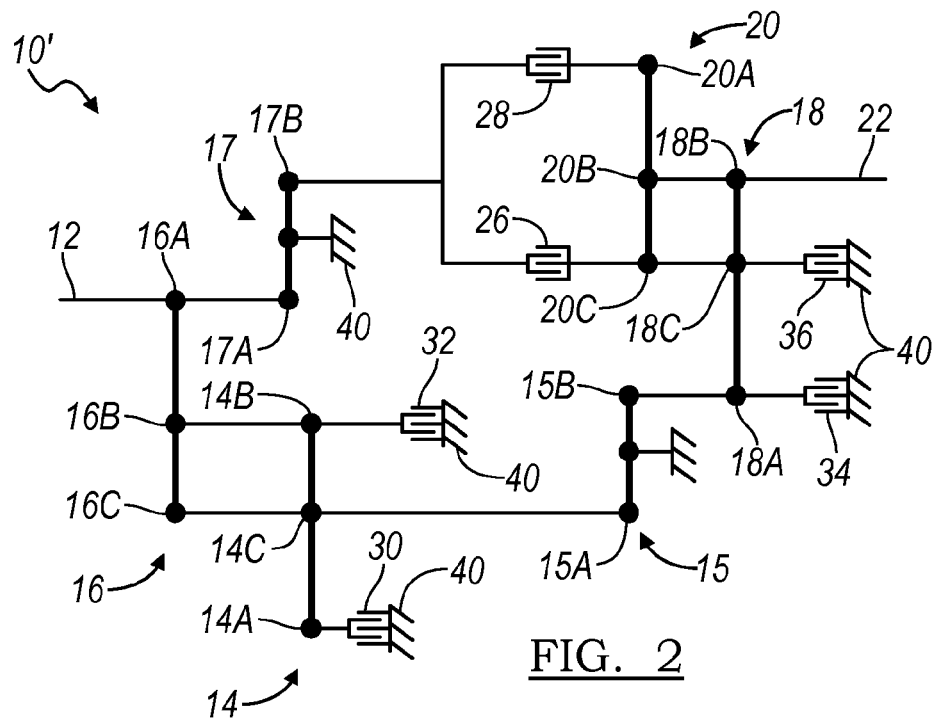
FIG. 2 is a lever diagram of an embodiment of a nine speed transmission according to the present invention.

Referring now to FIG. 2, an embodiment of a transmission 10' is shown in lever diagram form. More specifically, the lever diagram of FIG. 2 is a three node version of the four node lever diagram of FIG. 1A. The clutches, brakes, and couplings are correspondingly presented whereas the nodes of the levers 11, 13 are now represented by nodes of a first, second, third, and fourth planetary gear sets 14, 16, 18, and 20.

For example, the transmission 10' includes the input shaft or member 12, the first planetary gear set 14 having three nodes: a first node 14A, a second node 14B and a third node 14C, a first external gear pair 15 having a first node 15A and a second node 15B, the second planetary gear set 16 having three nodes: a first node 16A, a second node 16B and a third node 16C, a second external gear pair 17 having a first node 17A and a second node 17B, the third planetary gear set 18 having three nodes: a first node 18A, a second node 18B and a third node 18C, the fourth planetary gear set 20 having three nodes: a first node 20A, a second node 20B, and a third node 20C and the output shaft or member 22.

The input member 12 is coupled to the first node 16A of the second planetary gear set 16 and the first node 17A of the second external gear pair 17. The output member 22 is coupled to the second node 18B of the third planetary gear set 18 and the second node 20B of the fourth planetary gear set 20. The second node 14B of the first planetary gear set 14 is coupled to the second node 16B of the second planetary gear set 16. The third node 14C of the first planetary gear set 14 is coupled to the third node 16C of the second planetary gear set 16 and the first node 15A of the first external gear pair 15. The second node 15B of the first external gear pair 15 is coupled to the first node 18A of the third planetary gear set 18. The second node 18B of the third planetary gear set 18 is coupled to the second node 20B of the fourth planetary gear set 20. The third node 18C of the third planetary gear set 18 is coupled to the third node 20C of the fourth planetary gear set 20.

The first clutch 26 selectively connects the second node 17B of the second external gear pair 17 with the third node 18C of the third planetary gear set 18 and the third node 20C of the fourth planetary gear set 20. The second clutch 28 selectively connects the second node 17B of the second external gear pair with the first node 20A of the fourth planetary gear set 20. The first brake 30 selectively connects the first node 14A of the first planetary gear set 14 to the stationary member or a transmission housing 40. The second brake 32 selectively connects the second node 14B of the first planetary gear set 14 and the second node 16B of the second planetary gear set 16 to the stationary member or transmission housing 40. The third brake 34 selectively connects the second node 15B of the first external gear pair 15 and the first node 18A of the third planetary gear set 18 to the stationary member or transmission housing 40. The fourth brake 36 selectively connects the third node 18C of the third planetary gear set 18 and the third node 20C of the fourth planetary gear set 20 to the stationary member or transmission housing 40.

Figure 3:
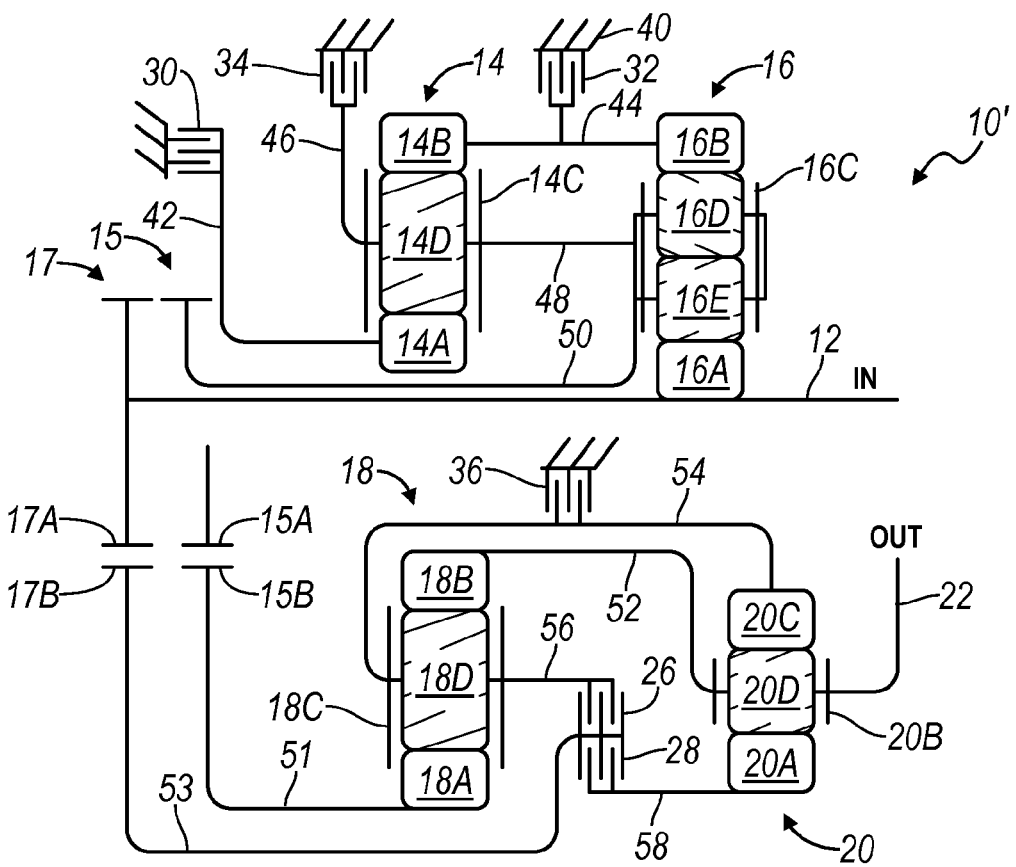
FIG. 3 is a diagrammatic view of an embodiment of a nine speed transmission according to the present invention.

Referring now to FIG. 3, a stick diagram presents a schematic layout of the embodiment of the nine speed transmission 10' according to the present invention. In FIG. 3, the numbering from the lever diagram of FIG. 2 is carried over. The clutches, brakes, and couplings are correspondingly presented whereas the nodes of the planetary gear sets now appear as components of planetary gear sets such as sun gears, ring gears, planet gears and planet gear carriers.

For example, the first planetary gear set 14 is coaxial with the input member 12 and includes a sun gear member 14A, a planet gear carrier member 14C and a ring gear member 14B. The sun gear member 14A is connected for common rotation with a first shaft or interconnecting member 42. The ring gear member 14B is connected for common rotation with a second shaft or interconnecting member 44. The planet gear carrier member 14C rotatably supports a set of planet gears 14D (only one of which is shown) and is connected for common rotation with a third shaft or interconnecting member 46 and a fourth shaft or interconnecting member 48. The planet gears 14D are each configured to intermesh with both the sun gear member 14A and the ring gear member 14B.

The second planetary gear set 16 is coaxial with the input member 12 and includes a sun gear member 16A, a planet carrier member 16C that rotatably supports a set of planet gears 16D and 16E, and a ring gear member 16B. The sun gear member 16A is connected for common rotation with the input member 12. The ring gear member 16B is connected for common rotation with the second shaft or interconnecting member 44. The planet carrier member 16C is connected for common rotation with the fourth shaft or interconnecting member 48 and a fifth shaft or interconnecting member 50. The planet gears 16D are each configured to intermesh with both the ring gear member 16B and the planet gears 16E. The planet gears 16E are each configured to intermesh with both the planet gears 16D and the sun gear 16A.

For example, the first planetary gear set 14 is coaxial with the input member 12 and includes a sun gear member 14A, a planet gear carrier member 14C and a ring gear member 14B. The sun gear member 14A is connected for common rotation with a first shaft or interconnecting member 42. The ring gear member 14B is connected for common rotation with a second shaft or interconnecting member 44. The planet gear carrier member 14C rotatably supports a set of planet gears 14D (only one of which is shown) and is connected for common rotation with a third shaft or interconnecting member 46 and a fourth shaft or interconnecting member 48. The planet gears 14D are each configured to intermesh with both the sun gear member 14A and the ring gear member 14B.

The second planetary gear set 16 is coaxial with the input member 12 and includes a sun gear member 16A, a planet carrier member 16C that rotatably supports a set of planet gears 16D and 16E, and a ring gear member 16B. The sun gear member 16A is connected for common rotation with the input member 12. The ring gear member 16B is connected for common rotation with the second shaft or interconnecting member 44, The planet carrier member 16C is connected for common rotation with the fourth shaft or interconnecting member 48 and a fifth shaft or interconnecting member 50. The planet gears 16D are each configured to intermesh with both the ling gear member 16B and the planet gears 16E. The planet gears 16E are each configured to intermesh with both the planet gears 16D and the sun gear 16A.

The first external gear pair 15 includes a first gear member 15A meshed with a second gear member 15B. The first gear member 15A is connected for common rotation with the fifth shaft or interconnecting member 50 and the second gear member 15B is connected for common rotation with a first transfer shaft or interconnecting member 51. In the example provided the first transfer shaft or interconnecting member 51 is parallel with and offset from the input member 12.

The second external gear pair 17 includes a first gear member 17A meshed with a second gear member 17B. The first gear member 17A is connected for common rotation with the input member 12 and the second gear member 17B is connected for common rotation with a second transfer shaft or interconnecting member 53. In the example provided the second transfer shaft or interconnecting member 53 is parallel with and offset from the first transfer shaft or interconnecting member 51 and the input member 12.

The third planetary gear set 18 is coaxial with the second transfer shaft or interconnecting member 53 and includes a sun gear member 18A, a ring gear member 18B and a planet carrier member 18C that rotatably supports a set of planet gears 18D. The sun gear member 18A is connected for common rotation with the first transfer shaft or interconnecting member 51. The ring gear member 18B is connected for common rotation with a sixth shaft or interconnecting member 52. The planet carrier member 18C is connected for common rotation with a seventh shaft or interconnecting member 54 and with an eighth shaft or interconnecting member 56. The planet gears 18D are each configured to intermesh with both the sun gear member 18A and the ring gear member 18B.

The fourth planetary gear set 20 is coaxial with the second transfer shaft or interconnecting member 53 and includes a sun gear member 20A, a ring gear member 20C, and a planet carrier member 20B that rotatably supports a set of planet gears 20D. The sun gear member 20A is connected for common rotation with a ninth shaft or interconnecting member 58. The ring gear member 20C is connected for common rotation with the seventh shaft or interconnecting member 54. The planet carrier member 20B is connected for common rotation with the sixth shaft or interconnecting member 52 and with the output member 22. The planet gears 20D are each configured to intermesh with both the sun gear member 20A and the ring gear member 20C.

The input shaft or member 12 is preferably continuously connected to an engine (not shown) or to a turbine of a torque converter (not shown). The output shaft or member 22 is preferably continuously connected with the final drive unit or transfer case (not shown).

The torque-transmitting mechanisms or clutches 26, 28 and brakes 30, 32, 34, 36 allow for selective interconnection of the shafts or interconnecting members, members of the planetary gear sets and the housing.

For example, the first clutch 26 is selectively engageable to connect the eighth shaft or interconnecting member 56 with the second transfer shaft or interconnecting member 53. The second clutch 28 is selectively engageable to connect the ninth shaft or interconnecting member 58 with the second transfer shaft or interconnecting member 53. The first brake 30 is selectively engageable to connect the first shaft or interconnecting member 42 to the stationary member or transmission housing 40 in order to restrict the sun gear member 14A of the first planetary gear set 14 from rotating relative to the stationary member or transmission housing 40. The second brake 32 is selectively engageable to connect the second shaft or interconnecting member 44 to the stationary member or transmission housing 40 in order to restrict the ring gear member 14B of the first planetary gear set 14 and the ring gear member 16B of the second planetary gear set 16 from rotating relative to the stationary member or transmission housing 40. The third brake 34 is selectively engageable to connect the third shaft or interconnecting member 46 to the stationary member or transmission housing 40 in order to restrict the planet carrier member 14C of the first planetary gear set 14, the planet carrier member 16C of the second planetary gear set 16, the first and second gear members 15A, 15B of the first external gear pair, and the sun gear 18A of the third planetary gear set 18 from rotating relative to the stationary member or transmission housing 40. The fourth brake 36 is selectively engageable to connect the seventh shaft or interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40.

Figures 4, 5:
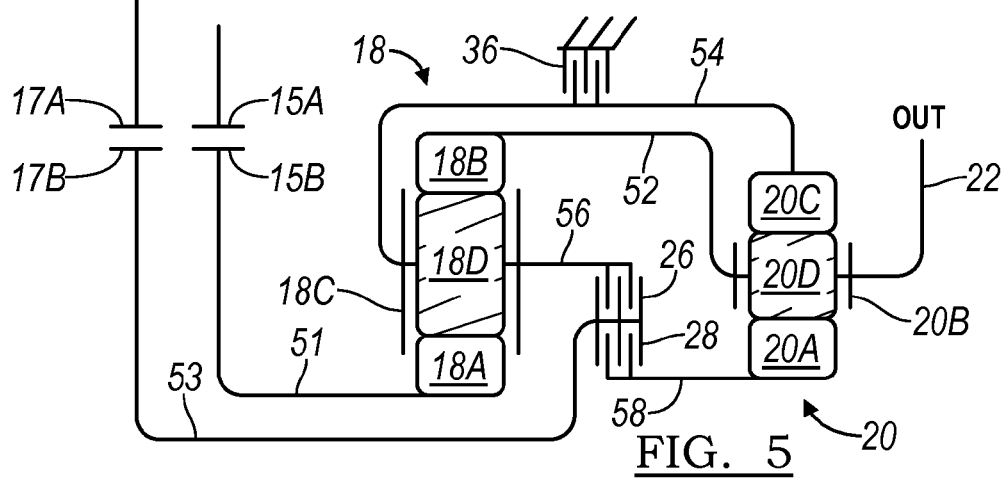
FIG. 4 is a truth table presenting the state of engagement of the various torque transmitting elements in each of the available forward and reverse speeds or gear ratios of the transmission illustrated in FIGS. 2 and 3.
FIG. 5 is a diagrammatic view of an embodiment of a nine speed transmission with an electric motor according to the present invention.

Referring now to FIGS. 3 and 4, the operation of the embodiment of the nine speed transmission 10' will be described. It will be appreciated that the transmission 10' is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36), as will be explained below. FIG. 4 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10'. An example of the gear ratios that may be obtained using the embodiments of the present invention are also shown in FIG. 4. Of course, other gear ratios are achievable depending on the gear diameter, gear teeth count and gear configuration selected.

To establish reverse gear, the first brake 30 and the fourth brake 36 are engaged or activated. The first brake 30 connects the first shaft or interconnecting member 42 to the stationary member or transmission housing 40 in order to restrict the sun gear member 14A of the first planetary gear set 14 from rotating relative to the stationary member or transmission housing 40. The fourth brake 36 connects the seventh shaft or interconnecting member 54 to the stationary member or transmission housing 40 in order to restrict the planet carrier member 18C of the third planetary gear set 18 and the ring gear member 20C of the fourth planetary gear set 20 from rotating relative to the stationary element or transmission housing 40. Likewise, the nine forward ratios are achieved through different combinations of clutch and brake engagement, as shown in FIG.4

Referring now to FIG. 5, an embodiment of a nine speed transmission 100 is shown. The transmission 100 is similar to the transmission 10', where like numbers refer to like components. The transmission 100 further includes an electric motor 102 that generally includes a stator and a rotor. The stator includes a plurality of windings or phases and is secured to a ground, stationary member, or the transmission housing 40 through a motor housing. The rotor includes a plurality of magnets and/or ferromagnetic members and is positioned radially inwardly of the stator. An output shaft of the rotor of the electric motor 102 is interconnected to the input member 12. In various implementations of the transmission 100, the electric motor 102 can be employed to provide regenerative braking. In some implementations, the electric motor 102 can be employed to launch and drive the vehicle in each of the nine forward gear ratios and the reverse gear ratio.

Figure 6:
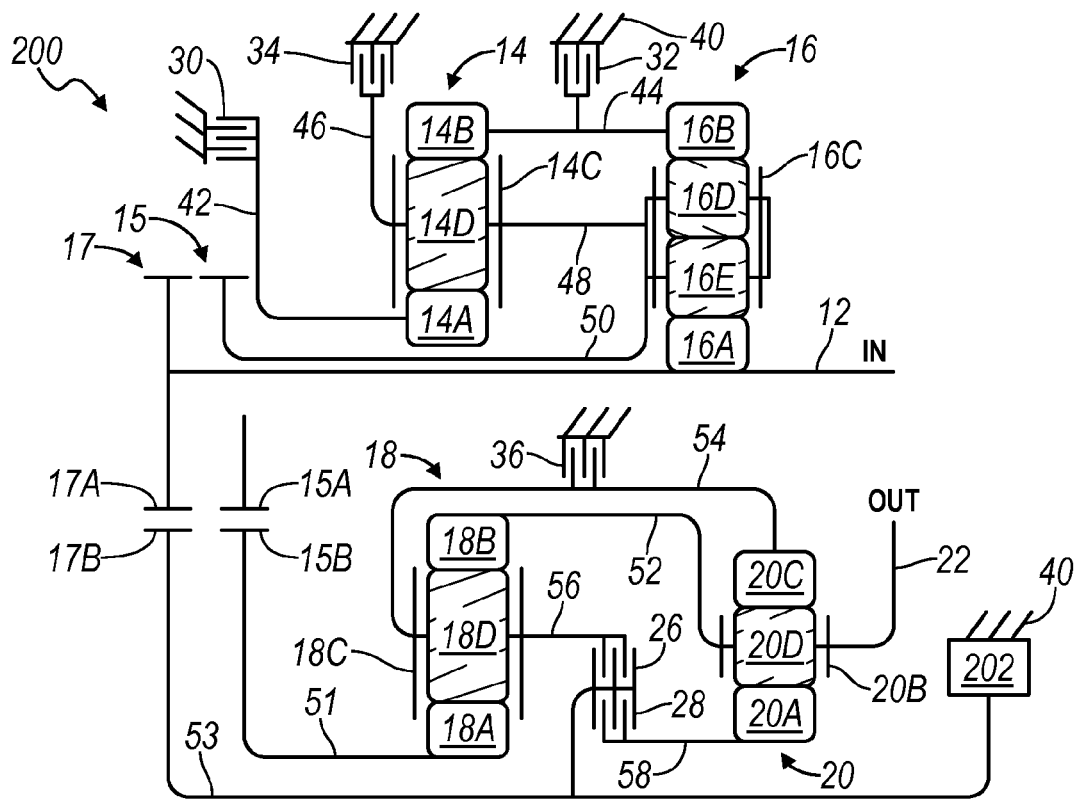
FIG. 6 is a diagrammatic view of an embodiment of a nine speed transmission with an electric motor according to the present invention.

Referring now to FIG. 6, an embodiment of a nine speed transmission 200 is shown. The transmission 200 is similar to the transmission 10', where like numbers refer to like components. The transmission 200 further includes an electric motor 202 that is similar to the electric motor 102 of FIG. 5. However, the output shaft of the rotor of the electric motor 202 is interconnected to the second transfer shaft or interconnecting member 53.

Figure 7:
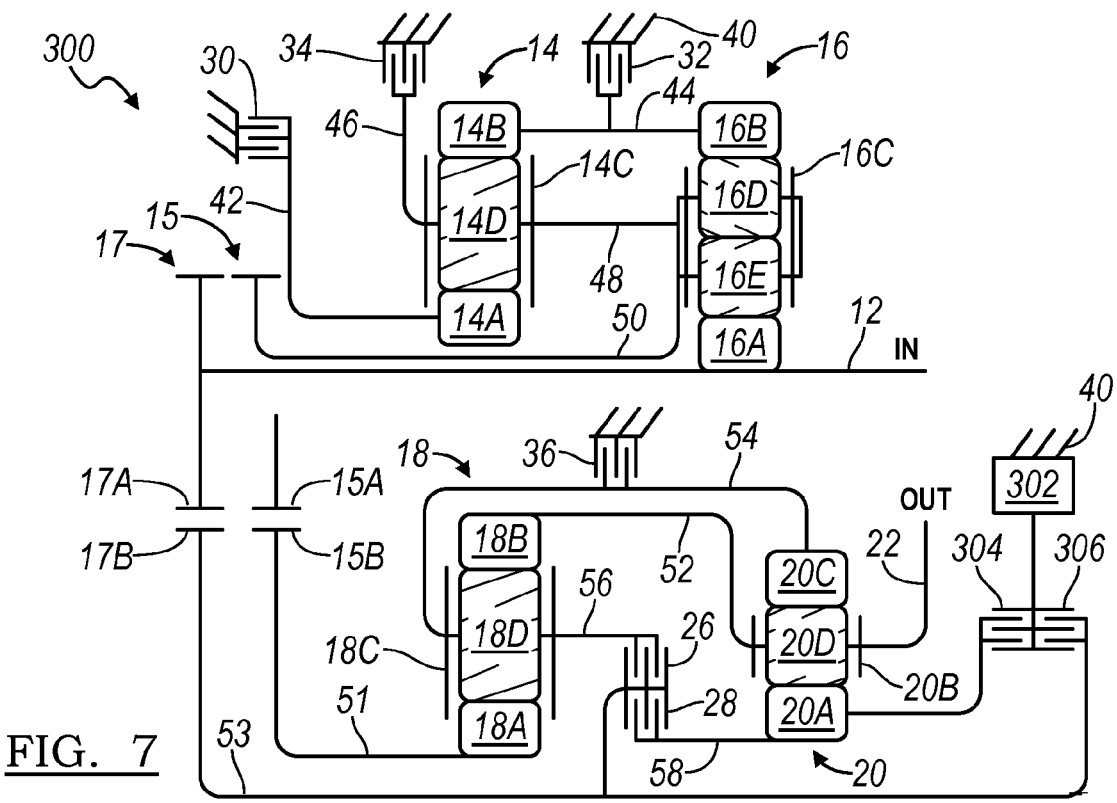
FIG. 7 is a diagrammatic view of an embodiment of a nine speed transmission with an electric motor according to the present invention.

Referring now to FIG. 7, an embodiment of a nine speed transmission 300 is shown. The transmission 300 is similar to the transmission 10', where like numbers refer to like components. The transmission 300 further includes an electric motor 302 that is similar to the electric motor 102 of FIG. 5. The output shaft of the rotor of the electric motor 302 is interconnected to a first motor clutch 304 and a second motor clutch 306. The first motor clutch 304 is selectively engageable to connect the motor 302 with the sun gear 20A of the fourth planetary gear set 20. The second motor clutch 306 is selectively engageable to connect the motor 302 with the second transfer shaft or interconnecting member 53.

Figure 8:
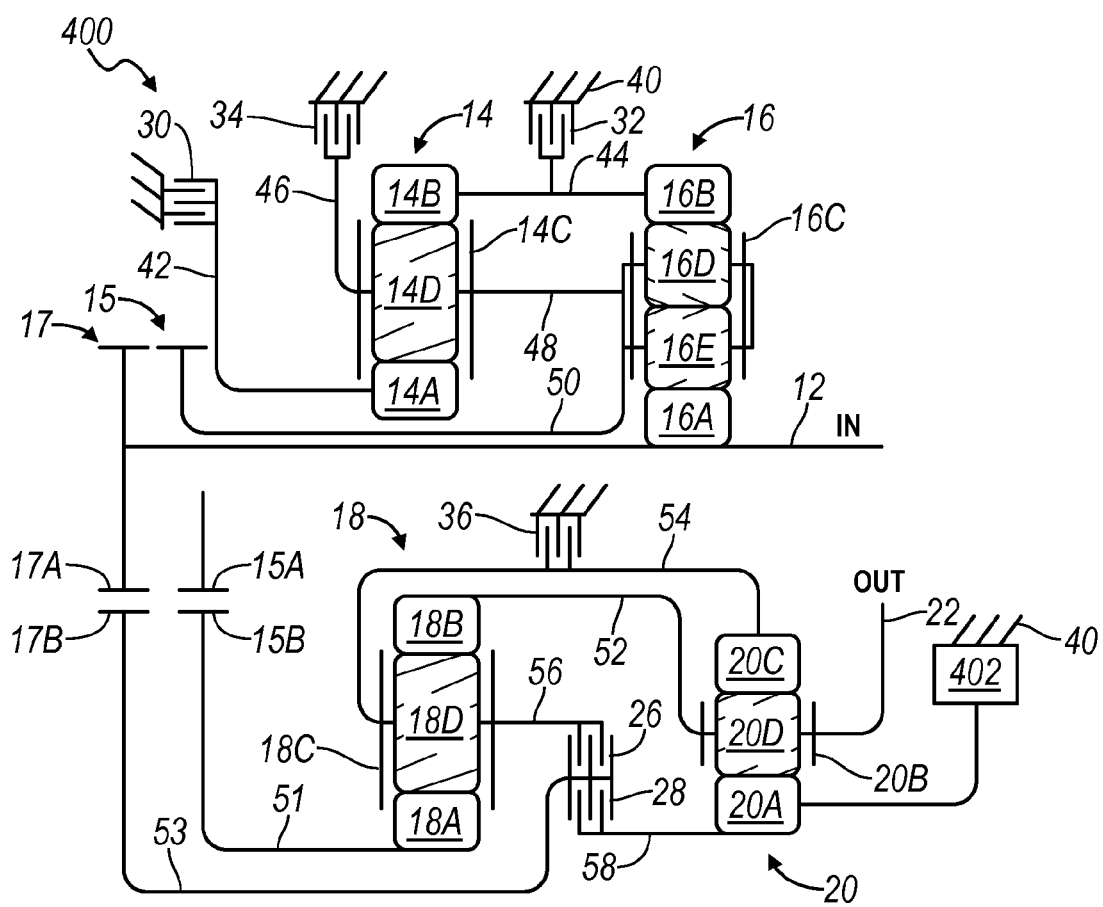
FIG. 8 is a diagrammatic view of an embodiment of a nine speed transmission with an electric motor according to the present invention.

Referring now to FIG. 8, an embodiment of a nine speed transmission 400 is shown. The transmission 400 is similar to the transmission 10', where like numbers refer to like components. The transmission 400 further includes an electric motor 402 that is similar to the electric motor 102 of FIG. 5. The output shaft of the rotor of the electric motor 402 is interconnected to the sun gear 20A of the fourth planetary gear set 20.

The present invention provides an improved transmission. In particular, the transmission provides a compact arrangement while also providing at least nine forward speed ratios. The compact arrangement is achieved by disposing a pair of the four planetary gear sets 14, 16, 18, and 20 along a first axis and by disposing another pair of the four planetary gear sets 14, 16, 18, and 20 along a second axis and coupling each pair with two external gear sets. Furthermore, the compact arrangement is beneficial for integration of electric motors in various hybrid configurations.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
an input member,
an output member;
a first and a second planetary gear set each having a first, a second, and a third member, wherein each of the first, second, and third members is included in one of a first rotary member, a second rotary member, a third rotary member, and a fourth rotary member, and wherein two of the members of the first planetary gear set are continuously separately connected with two of the members of the second planetary gear set to form two of the first, second, third, and fourth rotary members;
a third and a fourth planetary gear set each having a first, a second, and a third member, wherein each of the first, second, and third members is included in one of a fifth rotary member, a sixth rotary member, a seventh rotary member, and an eighth rotary member, and wherein two of the members of the third planetary gear set are continuously separately connected with two of the members of the fourth planetary gear set to form two of the fifth, sixth, seventh, and eighth rotary members;
a first coplanar gear set having a first member meshed with a second member, wherein the first member is continuously connected with the third rotary member and the second member of the first co-planar gear set is continuously connected with the eighth rotary member;
a second co-planar gear set having a first member meshed with a second member, wherein the first member is continuously connected with the first rotary member and the second member of the second co-planar gear set is separately selectively connectable with the fifth and seventh rotary members; and
six torque transmitting devices each selectively engageable to connect at least one of the first, second, third, fourth, fifth, sixth, seventh, and eighth rotary members with at least one other of a stationary member, the first and second members of the first and second co-planar gear sets, and the first, second, third, fourth, fifth, sixth, seventh, and eight rotary members, and
wherein the torque transmitting devices are selectively engageable in combinations of at least two to establish at least nine forward speed ratios and at least one reverse speed ratio between the input member and the output member.

2. The transmission of claim 1 wherein a first of the six torque transmitting devices is selectively engageable to connect the second member of the second co-planar gear set with the seventh rotary member.

3. The transmission of claim 2 wherein a second of the six torque transmitting devices is selectively engageable to connect the second member of the second co-planar gear set with the fifth rotary member.

4. The transmission of claim 3 wherein a third of the six torque transmitting devices is selectively engageable to connect the fourth rotary member with the stationary member.

5. The transmission of claim 4 wherein a fourth of the six torque transmitting devices is selectively engageable to connect the second rotary member with the stationary member.

6. The transmission of claim 5 wherein a fifth of the six torque transmitting devices is selectively engageable to connect the eighth rotary member with the stationary member.

7. The transmission of claim 6 wherein a sixth of the six torque transmitting devices is selectively engageable to connect the seventh rotary member with the stationary member.

8. The transmission of claim 1 wherein the first member of the second planetary gear set forms the first rotary member, the second members of the first and second planetary gear sets are continuously connected to form the second rotary member, the third members of the first and second planetary gear sets are continuously connected to form the third rotary member, the first member of the first planetary gear set forms the fourth rotary member, the first member of the fourth planetary gear set forms the fifth rotary member, the second members of the third and fourth planetary gear sets are continuously connected to form the sixth rotary member, the third members of the third and fourth planetary gear sets are continuously connected to form the seventh rotary member, and the first member of the third planetary gear set forms the eighth rotary member.

9. The transmission of claim 8 wherein the first members of the first, second, third, and fourth planetary gear sets are sun gears, the third members of the first, second, and third planetary gear sets and the second member of the fourth planetary gear set are carrier members, and the second members of the first, second, and third planetary gear sets and the third member of the fourth planetary gear set are ring gears.

10. The transmission of claim. 1 wherein the input member is continuously connected with first rotary member and the output member is continuously connected with the sixth rotary member.

11. The transmission of claim 1 wherein four of the six torque transmitting devices are brakes and two of the six torque transmitting devices are clutches.

12. The transmission of claim 1 further including an electric motor including a rotor that is continuously connected with the first member of the second co-planar gear set.

13. The transmission of claim 1 further including an electric motor including a rotor that is continuously connected with the second member of the second co-planar gear set.

14. The transmission of claim 1 further including a seventh torque transmitting device, an eighth torque transmitting device, and an electric motor including a rotor, wherein the seventh torque transmitting device is selectively engageable to connect the fifth rotary member with the rotor of the electric motor and the eighth torque transmitting device is selectively engageable to connect the second member of the second co-planar gear set with the rotor of the electric motor.

15. The transmission of claim 1 further including an electric motor including a rotor that is continuously connected with the fifth rotary member.

16. A transmission comprising:
an input member;
an output member;
first, second, third and fourth planetary gear sets each having first, second and third members, wherein the input member is continuously connected with the first member of the second planetary gear set and the output member is continuously connected with the second member of the fourth planetary gear set;
a first interconnecting member continuously connecting the second member of the first planetary gear set with the second member of the second planetary gear set;
a second interconnecting member continuously connecting the third member of the first planetary gear set with the third member of the second planetary gear set;
a third interconnecting member continuously connecting the second member of the third planetary gear set with the second member of the fourth planetary gear set;
a fourth interconnecting member continuously connecting the third member of the third planetary gear set with the third member of the fourth planetary gear set;
a first co-planar gear set having a first member meshed with a second member, wherein the first member is continuously connected with the third member of the second planetary gear set and the second member of the first co-planar gear set is continuously connected with the first member of the third planetary gear set;
a second co-planar year set having a first member meshed with a second member, wherein the first member is continuously connected with the first member of the second planetary gear set and the second member of the second co-planar gear set is selectively connectable to at least one of the members of the third and fourth planetary gear sets; and
six torque, transmitting devises each selectively engageable to interconnect at least one of the first, second, and third members with at least one other of the first members, second members, third members, and a stationary member, and
wherein the torque transmitting devices are selectively engageable in combinations of at least two to establish at least nine forward speed ratios and at least one reverse speed ratio between the input member and the output member.

17. The transmission of claim 16 wherein four of the six torque transmitting devises are brakes and two of the six torque transmitting devices are clutches.

18. The transmission of claim 16 wherein a first of the six torque transmitting devices is selectively engageable to connect the second member of the second co-planar gear set with the third member of the third planetary gear set, a second of the six torque transmitting devices is selectively engageable to connect the second member of the second co-planar gear set with the first member of the fourth planetary gear set, a third of the six torque transmitting devices is selectively engageable to connect the first member of the first planetary gear set with the stationary member, a fourth of the six torque transmitting devises is selectively engageable to connect the second member of the first planetary gear set With the stationary member, a fifth of the six torque transmitting devices is selectively engageable to connect the first member of the third planetary gear set with the stationary member, and a sixth of the six torque transmitting devices is selectively engageable to connect the third member of the third planetary gear set with the stationary member.

19. The transmission of claim 16 wherein the first members of the first, second, third, and fourth planetary gear sets are sun gears, the third members of the first, second, and third planetary gear sets and the second member of the fourth planetary gear set are carrier members, and the second members of the first, second, and third planetary gear sets and the third member of the fourth planetary gear set are ring gears.

20. The transmission of claim 16 further comprising an electric motor including a rotor, wherein the rotor is connected to one of the first member of the second planetary gear set, the second member of the second co-planar gear set, and the first member of the fourth planetary gear set.

21. The transmission of claim 16 further comprising a seventh torque transmitting device, an eighth torque transmitting device, and an electric motor including a rotor, wherein the seventh torque transmitting device is selectively engageable to connect the first member of the fourth planetary gear set with the rotor of the electric motor and the eighth torque transmitting device is selectively engageable to connect the second member of the second co-planar gear set with the rotor of the electric motor.

22. A transmission comprising;
an input member;
an output member;
first, second, third, fourth planetary gear sets each having a sun gear, a carrier member, and a ring gear, wherein the input member is continuously connected with the sun gear of the second planetary gear set and the output member is continuously connected with the carrier member of the fourth planetary gear set;

a first interconnecting member continuously connecting the ring gear of the first planetary gear set with the ring gear of the second planetary gear set;

a second interconnecting member continuously connecting the carrier member of the first planetary gear set with the carrier member of the second planetary gear set;

a third interconnecting member continuously connecting the ring gear of the third planetary gear set with the carrier member of the fourth planetary gear set;

a fourth interconnecting member continuously connecting the carrier member of the third planetary gear set with the ring gear of the fourth planetary gear set;

a first co-planar gear set having a first member meshed with a second member, wherein the first member is continuously connected with the carrier member of the second planetary gear set and the second member of the first co-planar gear set is continuously connected with the sun gear of the third planetary gear set;

second co-planar gear set having a first member meshed with a second member, wherein the first Member is continuously connected with the sun gear of the second planetary gear set;

a first torque transmitting device selectively engageable to connect the second member of the second co-planar gear set with the carrier member of the third planetary gear set;

a second torque transmitting devise selectively engageable to connect the second member of the second co-planar gear set with the sun gear of the fourth planetary gear set;

third torque transmitting device selectively engageable to connect the sun gear of the first planetary gear set with a stationary member;

a fourth torque transmitting device selectively engageable to connect the ring gear of the first planetary gear set with the stationary member a fifth torque transmitting device selectively engageable to connect the carrier member of the first planetary gear set with the stationary member; and a sixth torque transmitting device selectively engageable to connect the carrier member of the third planetary gear set with the stationary member, and wherein the torque transmitting devices are selectively engageable in combinations of at least two to establish at least nine forward speed ratios and at least one reverse speed ratio between the input member and the output member.

23. The transmission of claim 22 further comprising an electric motor including a rotor, wherein the rotor is connected to one of the sun gear of the second planetary gear set, the second member of the second co-planar gear set and the sun gear of the fourth planetary gear set.

24. The transmission of claim 22 further comprising a seventh torque transmitting device, an eighth torque transmitting device, and an electric motor including a rotor, wherein the seventh torque transmitting device is selectively engageable to connect the sun gear of the fourth planetary gear set with the rotor of the electric motor and the eighth torque transmitting device is selectively engageable to connect the second member of the second co-planar gear sot with the rotor of the electric motor.

* * * * *